Patented Oct. 29, 1940

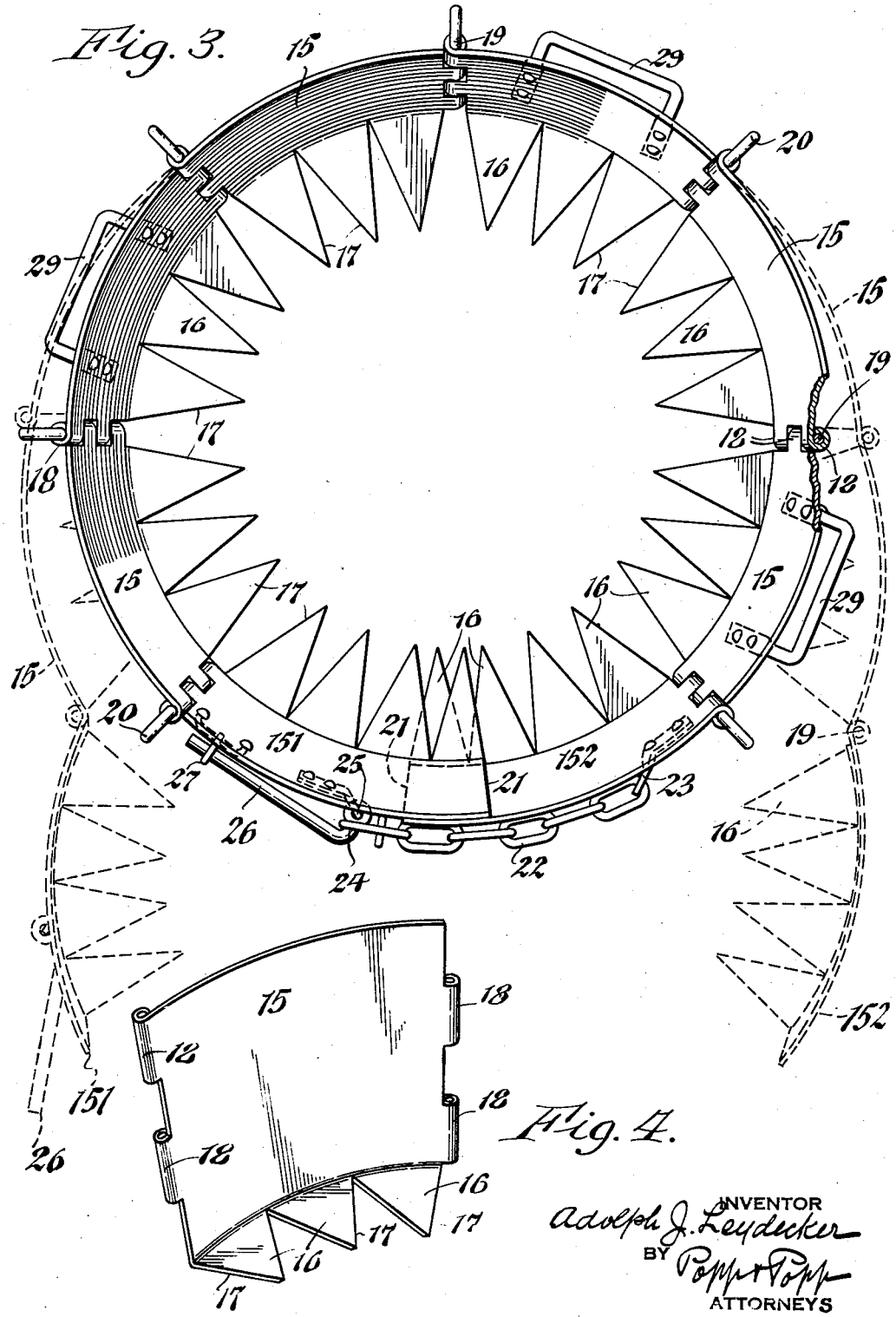

2,219,690

UNITED STATES PATENT OFFICE 2,219,690

TREE TRANSPLANTER

Adolph J. Leydecker, Williamsville, N. Y.

Application June 14, 1939, Serial No. 279,133

1 Claim. (Cl. 47—37)

This invention relates to an apparatus for transplanting trees particularly those which have grown to a large size and therefore require the roots of the same to be embedded in large balls or masses of earth or dirt in which the trees grew in order to ensure continued living of the trees after the same have been transplanted in new locations.

The apparatus commonly heretofore employed for this purpose consisted generally of a side wall which was engaged with the ball of dirt in which the roots of the tree were embedded and a platform which supported this ball on its underside, which members were tied together so as to form in effect a crate which enclosed the ball of dirt and served to keep the same in contact with the roots while being removed from the hole or trench in which the tree grew and transported to the new hole adapted to receive the tree.

These prior devices were not only cumbersome but also laborious and difficult to handle and thus raised the cost of removing and transplanting trees unduly high.

One of the objects of this invention is to provide an apparatus for transplanting trees which can be readily applied to the side and bottom of the ball of earth in which the roots of the tree are embedded and thus dispense with the usual platform or the like which have been necessary heretofore for this purpose.

Another object of this invention is to provide a tree transplanter which can be readily increased or decreased in size in order to adapt the same for removing and transplanting trees with balls of earth or dirt of different diameters.

A further object of this invention is to so organize this tree transplanting device that the same can be easily and conveniently applied to the side and bottom of the ball of dirt with a minimum of labor and to hold this ball of dirt in a solid condition so that the roots of the tree remain firmly embedded therein from the time the tree is removed until it is transplanted in a new location and thus ensure its continued growth.

An additional object of this invention is to construct the container of this tree transplanter mainly of sheet metal sections which can be readily dismembered for convenience in transportation and also reassembled for use and which are very strong and durable and not liable to become broken under the severest loads to which they may be subjected, thereby enabling work of this character to be done expeditiously and at low cost.

In the accompanying drawings:

Fig. 3 is a top plan view of the tree transplanter showing the relative position of its parts when the same are applied to the ball of earth enclosing the roots of a tree.

Fig. 4 is a perspective view of one of the sections of the container for enclosing a ball of earth.

In the following description similar characters of reference indicate like parts in the several figures of the drawings—

Figure 1:
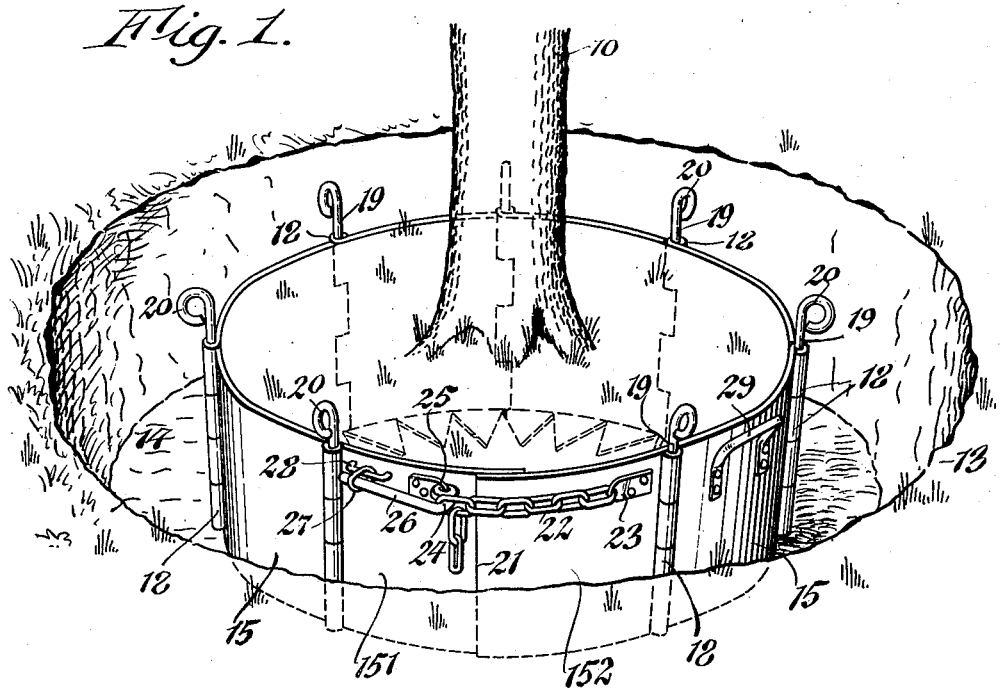
Fig. 1 is a perspective view showing my improved tree transplanter applied to a ball of earth enclosing the roots of a tree and ready to be removed from the location where the tree grew and transplanted in a new location.

The numeral 10 represents the upright trunk of a tree which has its roots 11 embedded in a ball or mass of earth 12 which has been separated at its side from the adjacent surface of the earth 13 by means of an annular trench or hole 14 while the underside of this ball rests on the bottom of this hole and is merged therewith.

The container of the tree transplanter which embodies this invention consists generally of a plurality of sections which are pivotally connected with each other so as to form a row or band which is adapted to be placed around the side and bottom of the ball of dirt, and tightening means whereby the ends of this band are drawn together and held firmly in engagement with the side and bottom of the ball of dirt.

Each of the sections of this container preferably includes an upright wall plate 15 such as steel which is adapted to engage with the side of the ball of dirt and a bottom support which is adapted to engage with the bottom of the ball of dirt adjacent to the periphery thereof. This wall plate preferably consists of sheet metal such as steel and the bottom support preferably consists of a plurality of inwardly tapering flat blades 16 which are also preferably made of sheet metal such as steel and formed integrally with the lower edge of the respective side wall plate 15. Each of the side plates 15 is preferably curved and tapered from its upper edge toward its lower edge so that when a plurality of such plates are assembled in an annular row the same form together an annular wall which is of downwardly tapering or conical form and serves as a container for holding the ball of dirt in which the roots of the tree are embedded. The tapering edges 17 of each of the blades 16 are preferably sharpened so that they form cutters whereby upon placing these container sections in the trench 14, and then moving the blades 16 inwardly toward the axis of the ball of dirt a cleavage between the bottom of this ball and the main part of the earth below the same will be produced and any roots of the tree in this part of the ball will also be severed so as to permit the subsequent lifting of the ball of dirt together with the roots of the tree therein from the trench more easily.

The several sections of the container are pivotally connected with each other so that the same in effect resemble the links of a chain which will permit these sections to be wrapped in the form of an annular row around the periphery of the ball of dirt. This pivotal connection between the several sections of the ball container is preferably effected by means of hinge eyes 18 formed on the vertical edges of the container sections excepting those sections 151, 152 which form the terminals or end members of the row, and hinge pins or pintles 19 passing vertically through corresponding hinge eyes on the opposing vertical edges of adjacent container sections. Each of these pintles is provided at its upper end with a loop or handle 20 which facilitates the engagement of this pintle with the respective hinge eyes of two adjacent container sections and also the withdrawal therefrom.

Figure 2:
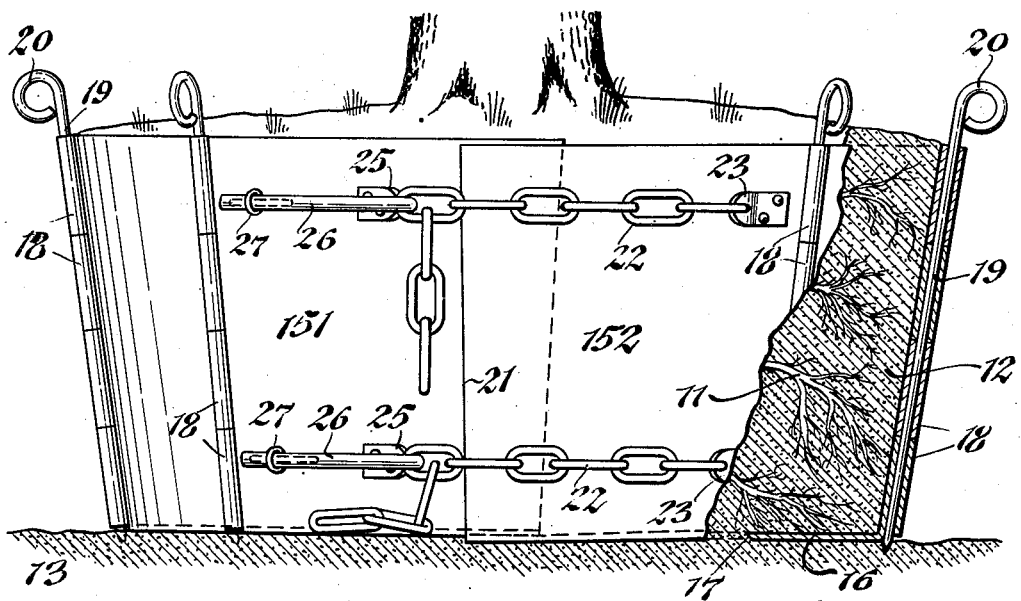
Fig. 2 is a side elevation of the same, on an enlarged scale, and partly in section.

The upright side wall plates 151, 152 of the container sections constituting the endmost members of terminals of the container sections have their front ends 21 straight, as shown in Figs. 1, 2 and 3, and these ends are adapted to overlap one another when the several sections of the container are placed around the ball of dirt.

Various means may be employed for drawing the several sections of the container around the ball of dirt and holding the same firmly in engagement therewith, those shown in the drawings being of simple construction and capable of being manipulated efficiently. As there shown, these tightening means comprise two tightening chains 22, 22 arranged on the outer side of the upper and lower parts of the endmost plates 151, 152 and connected at their rear ends to ears 23 secured to the adjacent part of the end plate 152, tightening levers each of which is of L-shaped form and having a short rear catch arm 24 pivoted on an ear 25 secured to the adjacent part of the upright end plate 151, and a long front locking arm 26 arranged at an angle to the companion short catch arm 24, and a retaining loop 27 adapted to be moved into and out of engagement with the long front locking arm 26 and slidable horizontally on a guideway 28 arranged on the adjacent part of the end plate 151 of the container.

Preparatory to transplanting the trees by the use of this apparatus an annular trench or hole 14 is first dug in the earth around the roots of the tree so as to leave a ball of dirt 12 of the desired size which has embedded therein enough of the root system 11 of the tree to ensure continued living of the tree after the same has been transplanted.

A plurality of container sections are now assembled in a row to form a band which is of sufficient length to not only form an annular wall around the ball of dirt but also permit of overlapping the upright plates 151, 152 of the endmost sections of this container. The several container sections are placed in the trench so that their bottom blades or supports rest on the bottom thereof and are spaced from the side of the ball of dirt enclosing the roots of the tree. One of the links on the free end portion of each of the tightening chains is now slipped over the long arm of each of the companion tightening levers while the latter are in a relaxed or untightened position and then both of these levers are swung forwardly and inwardly toward the adjacent end section 151 of the container whereby the short arm of each of these levers produces a pulling or tightening effect on the respective chain. This operation causes the several sections of the container to be drawn toward the center of the ball of dirt so that the diameter of this container is contracted or reduced, thereby moving the cutter blades or supports of the several container sections inwardly under the ball of earth and producing a cleavage of the earth in this plane as well as a severance of the free roots which are engaged by these blades. If desired the slack between the tightening levers and the respective tightening chains with which they cooperate may be repeatedly taken up by hitching the levers on new links of the chains until the several sections of the container have been moved inwardly sufficiently to engage their upright wall plates firmly with the periphery of the ball of dirt and the bottom supports or cutter blades have been drawn inwardly to the maximum extent, after which each of the tightening levers may be held in its operative tightened position by slipping the companion retaining loops 27 over the long locking arms of the respective levers, as shown in Figs. 1, 2 and 3.

Instead of drawing the several sections of the container inwardly and gradually contracting its diameter so that it fits around the ball of dirt by utilization of the locking levers, this contracting of the container sections may be effected either partly or wholly by hammering the lower ends of these sections inwardly until the upright wall plates 15, 151, 152 of the several container sections engage properly with the periphery of the ball of dirt and the lower or bottom supporting blades have been driven the requisite extent under the ball of dirt. In either case, however, the locking levers are utilized for holding the sections of the container in engagement with the periphery of the ball of dirt and the bottom supports or cutter blades in engagement with the underside of this ball.

After the container has been thus applied to the ball of dirt, the trunk of the tree with its roots embedded in this ball may be removed from the hole or trench 14 and if such removal is resisted by any roots extending from the ball of dirt into the earth below the same, such roots may be easily severed by a shovel or other tool passed underneath this ball.

While lifting the tree from this trench or hole the ball is held firmly in place so that the roots are properly embedded therein due to the fact that the several sections of the container form a wall which is of upwardly flaring form while the bottom supports or blades 16 engage with the underside of the ball and thus hold the latter reliably against displacement within the container.

After the ball of the tree has been removed from the trench formed in the earth where the tree grew, this ball is lowered in a similar hole or trench formed in the earth where the tree is to be relocated, after which the container sections are released by throwing the tightening levers backwardly and detaching the several container sections from each other by the withdrawal of the hinge pins 19, after which these container sections may be removed expeditiously and without undue manual effort.

For the purpose of manipulating the container when placing the same in a trench after the sections have been pivotally connected with each other, a sufficient number of the side plates of these container sections may be provided with handles for the use of the operators, three of such handles being shown at 29, these handles enabling the container to be manipulated to tear the roots and pry the container out of the hole.

Instead of separating the sections of the container from each other after the ball of dirt on the tree has been lowered in the trench, these several sections may be left in their connected condition and those sections adjacent to the opposite ends of the row may be first moved laterally outward and disengaged from the ball of dirt, as shown by dotted lines in Fig. 3, after which the remaining sections may be withdrawn from underneath this ball and thus leave the apparatus in condition for immediate use in transplanting another tree.

Owing to the fact that the container of this tree transplanter may be either increased or decreased in size by the use of the desired number of sections, this apparatus is very flexible and permits trees of various size to be conveniently and effectively transplanted by practically the same apparatus which is capable of expansion and contraction to suit the size of the tree which is to be moved.

Moreover the utilization of a plurality of sections to produce this container and the means which permit the same to be readily connected and disconnected provides an apparatus which can be compactly stored when the same is not in use and also transported to the location where a tree is to be transplanted.

Furthermore, by making the container of this apparatus in sections the same can be readily made of varying dimensions so that substantially the same apparatus can be used for transplanting trees of different sizes and thus permit of doing this work more economically than would be the case if apparatus of different sizes were employed to suit the size of the tree.

I claim as my invention:

A tree transplanter comprising a plurality of upright inclined side plates which are adapted to be placed in an annular row around a ball of dirt containing the roots of a tree and forming a downwardly tapering wall which supports the ball around the entire peripheral side thereof, a plurality of horizontal bottom plates arranged in an annular row and adapted to engage the marginal part of the underside of said ball and separate the same from the bottom of the trench from which the tree is being removed, each of said bottom plates projecting horizontally inward from one of the side plates and having its inner end of inwardly tapering form and provided with a sharp edge, and each side plate being movable horizontally inward against a side part of the ball and the bottom plate being driven horizontally inward between the underside of said ball and the bottom of the trench containing the tree for severing its roots from the dirt, and means for detachably connecting adjacent side plates together with the bottom plates thereon.

ADOLPH J. LEYDECKER.